U nited States Patent [19]

Darby et al.

[11] Patent Number: 4,725,966
[45] Date of Patent: Feb. 16, 1988

[54] IMAGE MODIFICATION

[75] Inventors: Samuel E. Darby, Harrow; Brent A. Hayhoe, East Finchley, both of England

[73] Assignee: Crosfield Electronics Limited, London, England

[21] Appl. No.: 727,157

[22] Filed: Apr. 25, 1985

[30] Foreign Application Priority Data

Apr. 27, 1984 [GB] United Kingdom ................. 8410860

[51] Int. Cl.⁴ ............................................. G06F 11/00
[52] U.S. Cl. .................................... 364/518; 358/280; 382/44
[58] Field of Search ............... 364/525, 526, 518, 521; 350/500; 358/11, 17, 78, 77, 80, 319, 42, 58, 903, 280, 283, 284, 298; 382/44–46, 54

[56] References Cited

U.S. PATENT DOCUMENTS 3,996,421 12/1976 Pruznick et al. ..................... 358/166
4,389,677 6/1983 Rushby et al. ..................... 371/41 X
4,517,607 5/1985 Ohkouchi et al. ................. 382/54 X
4,555,801 11/1985 Miyagawa et al. ................ 382/45 X
4,583,116 4/1986 Hennig et al. ..................... 358/80 X
4,586,089 4/1986 Nakazato et al. ................. 382/54 X
4,599,656 7/1986 Bellinghausen ................. 358/284 X
4,617,592 10/1986 MacDonald ....................... 358/78 X

FOREIGN PATENT DOCUMENTS 0096084 4/1982 European Pat. Off. .

OTHER PUBLICATIONS

IEEE Transactions on Pattern Analysis and Machine Intelligence, vol. PAMI-4 (1982) May.

Primary Examiner—Gary V. Harkcom
Assistant Examiner—H. R. Herndon
Attorney, Agent, or Firm—Sughrue, Mion, Zinn, Macpeak and Seas

[57] ABSTRACT

A method and apparatus for modifying an image represented by digital data defining the content of one or more pluralities of cells constituting one or more color separations is described. The digital data indicates for each cell whether the respective color is "present" or "absent". The apparatus comprises scanning means (15,16) for electronically scanning along a plurality of scan lines with a mask of preselected dimensions; the respective plurality of digital data corresponding to a region including a boundary for one or more of the color separations. Programmable logic determines at each position of the mask whether the portion of the color separation within the mask includes at least one cell the content of which indicates color "present"; and modifies the digital data at another, predetermined position within the mask to change the content of the respective cell or cells of the color separation to represent color "present" or color "absent" when color "present" is detected within the mask. The boundary is thus "gripped" either positively or negatively.

8 Claims, 5 Drawing Figures

Fig. 2.
(a) 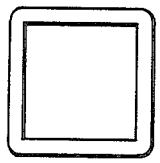
(b) 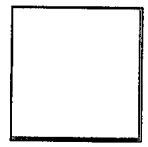
(c) 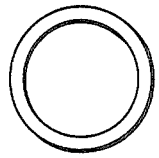
(d) 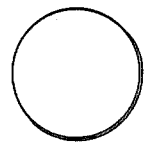

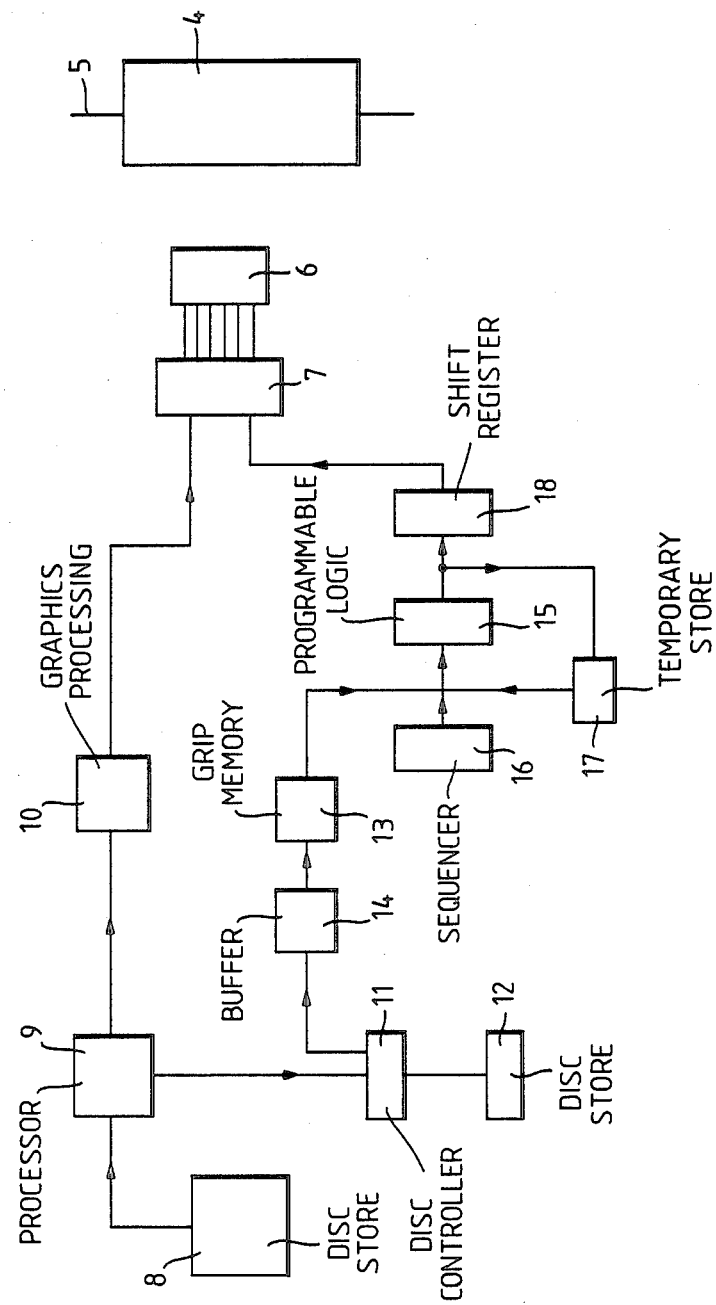

IMAGE MODIFICATION

The invention relates to a method and apparatus for modifying a boundary of an image represented by digital data defining the content of one or more pluralities of cells constituting at least a portion of one or more colour separations respectively.

In the field of printing, images are represented by one or more colour separations, such as cyan, magenta, yellow, and black. Where an image, typically a high resolution or "text" image, is to be included within a lower resolution or graphics image and the colour of the text image is such that one or more colour separations are required then, typically, a suitable gap is generated in those non-required colour separations, the gap corresponding in shape to the high resolution image.

Problems arise when the separations are registered since for various reasons such as paper stretch and misregistration, the colour separation(s) providing the high resolution image does not exactly register the image with the corresponding gap on one or more of the other colour separations. This results in the generation of a white border around at least part of the image.

In the past, this problem has been solved by interposing a clear sheet between the colour separation or separations carrying the high resolution image and the contact print so that the high resolution image is slightly diffused and the generation of borders is prevented. This practice is technically known as "grip" or spreading and should not be confused with enlargement which is a fundamentally different process.

With the advent of modern imaging apparatus in which colour separations are generated electronically it is desirable to deal with the misregistration problem electronically.

In this specification the terms "low " and "high" resolution are used only in a relative sense. Low resolution for example may comprise 900 pixels per square inch.

One attempt at dealing with this problem is described in EP-A-0096084. This specification describes a complex system primarily for determining the position of a boundary of an image which is then spread. This leads to a complexity of a degree such that real time processing is not possible.

In accordance with one aspect of the present invention, a method of modifying a boundary of an image represented by digital data defining the content of one or more pluralities of cells constituting at least a portion of one or more colour separations, the digital data indicating for each cell whether the respective colour is "present" or "absent" comprises for one or more of the colour separations, electronically scanning the respective plurality of digital data corresponding to a region including a boundary with a mask of pre-selected dimensions; at each position of the mask determining whether the portion of the colour separation within the mask includes the boundary; and, if it does, modifying the digital data at another, predetermined position within the mask to change the content of the respective cell or cells of the digitally defined colour separation at that position to represent colour "present" or colour "absent".

With this method, "grip" is carried out on the digital data when the cell content is changed to colour "present" so that the boundary of the image, which will normally be a high resolution image in which the high resolution cells typically have a density of 3600 per square inch, is slightly spread.

In addition, the method enables image shrink (or negative grip) to be carried out when the cell content is changed to colour "absent".

One of the major advantages of the invention is that it enables grip to be applied in real time as a record medium is exposed to one or more scanning beams modulated under the control of the digital data. This is possible because of the very simple method which is adopted.

Preferably, the mask is moved one, normally high resolution, cell at a time across the colour separation, the predetermined position within the mask defining a single (high resolution) cell.

In some cases, the region containing the boundary may be predetermined. However, preferably, the mask is scanned across the entire digitally defined colour separation, and at each scanning position the digital data within the mask is detected whereby the presence of a boundary within the mask is determined if a transition in the detected digital data is detected. In this way the boundary is automatically located during scanning.

It should be understood that in general the digital data will not be modified in a store but rather is copied from one store to another with modifications being performed during transfer.

In one particularly advantageous application, a method of generating a physical colour separation comprises causing relative movement between one or more exposing beams and a record medium whereby the record medium is scanned by the exposing beams and modulating the exposing beams in response to digital data defining for each of a plurality of cells whether the respective colour is "present" or "absent"; and during relative scanning movement modifying a boundary of the image, which has not yet been exposed, by carrying out a method according to the one aspect of the invention.

In accordance with a second aspect of the present invention, apparatus for modifying a boundary of an image represented by digital data defining the content of one or more pluralities of cells constituting at least a portion of one or more colour separations, the digital data indicating for each cell whether the respective colour is "present" or "absent" comprises scanning means for electronically scanning, along a plurality of scan lines with a mask of pre-selected dimensions, the respective plurality of digital data, corresponding to a region including a boundary, for one or more of the colour separations; means for determining at each position of the mask whether the portion of the colour separation within the mask includes the boundary; and means for modifying the digital data at another, predetermined position within the mask to change the content of the respective cell or cells of the digitally defined colour separation to represent colour "present" or colour "absent".

Preferably, the means for selecting the dimensions of the mask enables different mask shapes to be generated.

The shape of the mask is conveniently one of a continuous outline square, a solid square, a continuous outline circle, a solid circle, a continuous cross, a four point cross, and a five point square. The solid circle is the most preferable shape but is less convenient to represent electronically.

It should be appreciated that the mask has no physical existance but its effect is generated by the scanning means.

Conveniently, the apparatus comprises a first store to which the digital data is fed, the store having A×B cells where A is at least the number of cells in a single scan line and B is at least equal to the number of cells defining one dimension of the mask; a second store having C×D cells where C defines a plurality of scan lines and D defines a plurality of scan lines at least equal to another dimension of the mask; and processing means for scanning and modifying the data from the first store, transferring suitably modified data to the second store, and scanning and modifying the data from the second store whereby a mask is scanned along a boundary of the image to grip the boundary. For a square mask B and D will be equal C will equal the number of lines simultaneously scanned (e.g. six).

Typically, the apparatus will form part of scanning apparatus such as the Crosfield Magnascan 600 series. The digital data may be generated at the same time as the colour separations are generated or alternatively, the digital data may have been previously generated and stored. Furthermore, the modified data may be stored or fed directly to colour separation generating apparatus.

An example of a method and apparatus in accordance with the present invention will now be described with reference to the accompanying drawings, in which:

FIG. 2 illustrates different forms of mask;

FIG. 3 is a block diagram illustrating scanning apparatus;

Figure 1:
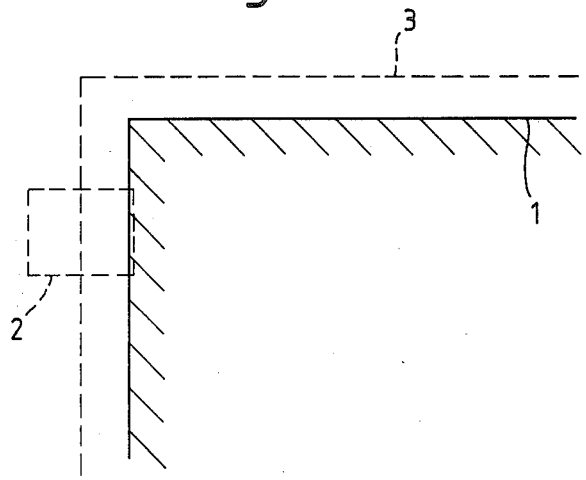
FIG. 1 is a diagram of part of a high resolution image showing the effect of grip.

FIG. 1 illustrates a small portion of a relatively large text image which may be a black letter. For example, FIG. 1 could form the top left portion of a letter T. The border of the letter in its original form is illustrated at 1. In this context "large" means that the portion of the image shown is represented by many cells of digital data. The application of a solid square mask 2 (shown in phantom) over the text image causes the position of the border 1 to move out to the position indicated by the dashed line 3. FIG. 2 illustrates various forms of mask which can be used, FIG. 2b illustrating a solid square mask.

For convenience, it will be assumed that the text image is black so that only one colour separation is concerned. In practice, the original text image is scanned at high resolution to generate a plurality of text cells representing a black colour separation, the resolution of the cells being 900–1800 per square inch. Each cell is coded with a single binary digit as either "0" meaning colour "absent" or "1" meaning colour "present". In the invention, the solid square which may for example have dimensions of 72×72 high resolution cells is scanned across the stored digitally coded separation one text cell at a time. At each position the digital data within the mask is scanned. If the mask is wholly within the image this will be all "1" and no modification is carried out. If, however, the mask overlaps a border there will be one or more transitions from "1" to "0". As soon as the square encompasses a border the colour separation data most nearly corresponding to the centre of the mask 2 is changed from its current value to "1". In effect, the original border of the image 1 is moved by a distance corresponding to half the square dimension to the position shown by the dashed line 3. Other effects can be created by using different mask forms as illustrated in FIGS. 2a, c, and d.

FIG. 3 illustrates in block diagram form the apparatus, which comprises a cylinder 4 rotatable about an axis 5. The cylinder 4 may be a gravure cylinder or carry a light sensitive sheet (not shown). An exposing head 6 is positioned adjacent the cylinder 4 and is movable in a direction parallel with the axis 5 of the cylinder 4. The exposing head 6 comprises six laser beam modulators which are controlled by respective beam computers mounted in a control block 7. A laser (not shown) generates a laser beam which is split into six subsidiary beams which are fed to respective ones of the modulators. This corresponds to the Crosfield Magnascan 600 series.

Digital image data including colour information and spatial information which has been previously generated in a conventional manner is stored in a 300 MB Winchester disk 8. This information will contain both high and low resolution image data. The low resolution or graphics data is supplied under the control of a processor 9 (such as a DEC LSI 11) to the beam computers in the control block 7 via conventional graphics processing electronics 10 for correcting printing ink colours. Spatial data and the high resolution data is channeled by the processor 9 via a disc controller 11 (such as an SMS FWD 5001) to an 80MB Winchester disc 12. Subsequently the data on the disc 12 is fed to a grip memory 13, constituted by a RAM, via a buffer 14. Data is taken from the grip memory 13, as will be described below, and is fed to programmable logic 15 (such as an MMI PAL) which is controlled by a sequencer 16 (such as a ROM latch sequencer).

Figure 4:
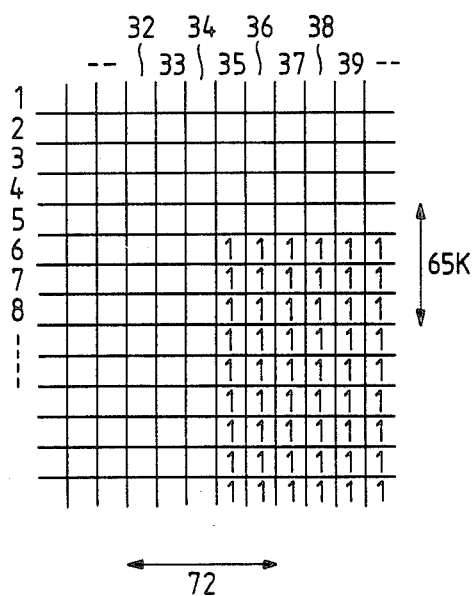
FIG. 4 illustrates part of the grip memory.

The high resolution data is fed from the disc 12 in six bit words, so that each word corresponds to one set of cells generated by the six laser beams. The six bit words are stored in the grip memory 13 which is capable of storing data for controlling 12 adjacent full circumferential scans of the laser beams. Typically, there are about 75,000 high resolution cells in one circumference of the cylinder 4 and thus the grip memory 13 has dimensions of about 75,000×72 bits. The latter dimension corresponds to the maximum allowed x (or axial) dimension of the mask. FIG. 4 illustrates a portion of the grip memory 13 in which it will be seen that part of a high resolution image is to be found in the lower right hand quadrant.

Figure 5:
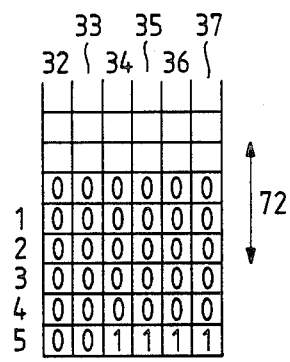
FIG. 5 illustrates part of a temporary store.

In operation, the upper row of 72 bits in the grip memory 13 is read into the programmable logic 15 (row 1 in FIG. 4). The sequencer 16 causes this line of data to be processed by the programmable logic. In this example, it will be assumed that the mask is a solid square having dimensions of 3×3 high resolution cells, for convenience. In this implementation masks with dimensions up to 72×72 can be used. The actual shape and dimension are set by the sequencer 16. Since there are six laser beams used to generate the image, the middle six binary digits of the 72 digits of row 1 are examined by the programmable logic. These are numbered 33–38 in FIG. 4. Firstly, bit number 33 is examined and if this had been a logical "1" then the centre of the mask, in this case the next adjacent cell 32 in the preceding row, would have been coded as a logic "1". However, bit number 33 is "0" and so no change is made. Digit 34 is then examined and the process is repeated through to digit 38. This generates an output comprising six binary digits representing the preceding row which is fed to a temporary store 17 (FIG. 5). This store has dimensions of 72×6 bits (the first dimension corresponding to the maximum allowed y (or circumferential) dimension of the mask and the second dimension (6) corresponding to the number of scanning beams) and when six new digits are input, the oldest six are discarded. It will be appreciated that each of the six bits stored in the temporary register 17 represents part of a different line of high resolution cells extending in the circumferential direction.

At this point row 1 has been scanned in the left to right direction and it is now necessary to scan in the top to bottom direction. The data in the temporary store 17 is then processed in the "top to bottom direction" by the programmable logic 15 in exactly the same way to produce a further output comprising six binary digits which are fed to a shift register 18 from which they are fed to the beam computers. The beam computers are then controlled by the control block 7 to cause the laser beams to respond to high or low resolution data in a conventional manner. For example as described in our copending U.S. patent application No. 686,793.

The next row 2 is then output to the programmable logic 15 and processed in a similar way and so on. When row 6 is reached a logical "1" is found in cells 35 to 38 and so cells 34 to 37 in row 5 are changed to logical "1" thus enlarging the image by one text cell. The input to the control block 7 is thus the same as the original high resolution control data but with the high resolution image spread by one cell.

The order in which data is processed in the memory 13, and store 17 can be at the user's convenience. For example a block of data in the grip memory 13 could be processed and transferred to the store 17 and then processed in the store 17 before another block is processed in the memory 13.

We claim:

1. A method of modifying a boundary of an image represented by digital data defining the content of at least one plurality of cells constituting at least a portion of at least one colour separation, said digital data indicating for each cell whether the respective colour is "present" or "absent", the method comprising, for at least one of said colour separations, selecting a mask from a plurality of masks of different dimensions, electronically scanning the respective plurality of digital data corresponding to a region including a boundary with said mask of pre-selected dimensions; at each position of said mask determining whether the portion of said colour separation within the mask includes the boundary; and, if it does, modifying said digital data at another, predetermined position within said mask to change the content of the respective cell or cells of said digitally defined colour separation at that position to represent colour "present" or colour "absent".

2. A method according to claim 1, wherein said mask is moved one cell at a time across the digitally defined colour separation, said predetermined position within the mask being defined by a single cell.

3. A method according to claim 1, wherein said mask is scanned across the entire digitally defined colour separation, and at each scanning position the digital data within said mask is detected whereby the presence of a boundary within said mask is determined if a transition in said detected digital data is detected.

4. A method according to claim 2, wherein said mask is scanned across the entire digitally defined colour separation, and at each scanning position the digital data within said mask is detected whereby the presence of a boundary within said mask is determined if a transition in said detected digital data is detected.

5. A method of generating a physical colour separation comprising causing relative movement between one or more exposing beams and a record medium whereby said record medium is scanned by said exposing beams and modulating said exposing beams in response to digital data defining for each of a plurality of cells whether the respective colour is "present" or "absent"; and modifying a boundary of a part of the image which has not yet been exposed, during said relative scanning movement, said boundary being modified by electronically scanning the respective plurality of digital data corresponding to a region including a boundary with a mask of pre-selected dimensions; at each position of said mask determining whether the portion of said colour separation within the mask includes the boundary; and, if it does, modifying said digital data at another, predetermined position within said mask to change the content of the respective cell or cells of said digitally defined colour separation at that position to represent colour "present" or colour "absent".

6. Apparatus for modifying a boundary of an image represented by digital data defining the content of at least one plurality of cells constituting at least a portion of at least one colour separation, the digital data indicating for each cell whether the respective colour is "present" or "absent", the apparatus comprising selecting means for selecting a mask from a plurality of masks of different dimensions, scanning means for electronically scanning, along a plurality of scan lines with a mask of preselected dimensions, said respective plurality of digital data, corresponding to a region including a boundary for said at least one colour separation; means for determining at each position of said mask whether the portion of said colour separation within said mask includes the boundary; and means for modifying the digital data at another, predetermined position within said mask to change the content of the respective cell or cells of said digitally defined colour separation to represent colour "present" or colour "absent".

7. Apparatus according to claim 6, wherein the shape of said mask is one of a continuous outline square, a solid square, a continuous outline circle, a solid circle, a continuous cross, a four point cross, and a five point square.

8. Apparatus according to claim 6, comprising a first store to which said digital data is fed, said store having $A \times B$ cells where A is at least the number of cells in a single scan line and B is at least equal to the number of cells defining one dimension of said mask; a second store having $C \times D$ cells where C defines a plurality of scan lines and D defines a plurality of scan lines at least equal to another dimension of said mask; and processing means for scanning and modifying the data from said first store, transferring suitable modified data to said second store, and scanning and modifying said data from said second store whereby a mask is scanned along a boundary of the image to grip the boundary.

* * * * *